US007533367B2

(12) United States Patent
Balsiger et al.

(10) Patent No.: US 7,533,367 B2
(45) Date of Patent: May 12, 2009

(54) BEHAVIOR ARCHITECTURE FOR COMPONENT DESIGNERS

(75) Inventors: Fred W. Balsiger, Carnation, WA (US); Brian Keith Pepin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 923 days.

(21) Appl. No.: 10/609,348

(22) Filed: Jun. 27, 2003

(65) Prior Publication Data

US 2004/0263515 A1 Dec. 30, 2004

(51) Int. Cl.
*G06F 9/44* (2006.01)
*G06F 17/00* (2006.01)
*G06F 3/00* (2006.01)

(52) U.S. Cl. ........................ 717/109; 715/273; 715/745

(58) Field of Classification Search ................. 717/105, 717/109, 110

See application file for complete search history.

(56) References Cited

U.S. PATENT DOCUMENTS 5,121,477 A 6/1992 Koopmans et al. .......... 345/762
5,530,796 A 6/1996 Wang ......................... 345/762
5,841,434 A 11/1998 Arda et al. .................. 345/804
5,959,624 A * 9/1999 Johnston et al. ............. 715/746
6,091,416 A 7/2000 Cragun ....................... 345/837
6,098,073 A 8/2000 O'Rourke ................ 707/104.1
6,104,391 A * 8/2000 Johnston et al. ............. 715/745
6,731,310 B2 * 5/2004 Craycroft et al. ............ 715/765
6,750,887 B1 * 6/2004 Kellerman et al. .......... 715/788
7,002,597 B2 * 2/2006 Arnold et al. ............... 345/611
2002/0149629 A1 * 10/2002 Craycroft et al. ............ 345/861
2003/0174168 A1 * 9/2003 van Leersum ............... 345/764
2005/0114797 A1 * 5/2005 Nguyen ...................... 715/863

OTHER PUBLICATIONS

Chusho, T.; Ishigure, H.; Konda, N.; and Iwata, T.; "Component-Based Application Development on Architecture of a Model, UI and Components"; Proceedings Seventh Asai-Pacific Software Engineering Conference APSEC 2000; Singapore; Dec. 5-8, 2000; p. 349-53.

Haiying Wang and Green, Mark; "UISDT:A Tool for Structuring User Interfaces"; Proceedings of 3rd International Conference on CAD & CG; Beijing, China; Aug. 23-26, 1993; vol. 1; p. 199-205.

(Continued)

*Primary Examiner*—Tuan Q Dam
*Assistant Examiner*—Isaac T Tecklu
(74) *Attorney, Agent, or Firm*—Workman Nydegger

(57) ABSTRACT

Methods, systems, and computer program products for centrally managing user interface state information for a visual user interface development tool. Component and development tool behavior is centralized in a behavior service that allows behaviors to be defined at development time. The behavior service catches messages that are generated within the visual user interface development tool and routes the message to determine behaviors available within the development tool. If a suitable behavior is available, the behavior is used to process the message. Similar to behaviors, during development time the behavior service may store one or more glyphs with corresponding glyph behavior for a component within the development tool. These glyphs are capable of hit testing and painting themselves, and may be organized into one or more adorner layers that can be independently disabled and enabled.

37 Claims, 6 Drawing Sheets

100
108A
108B
Button
Text Box
108C
108D
Radio Button
Custom Control
108E
148
158
142
156
Button
130
152
144
146
154
120
110
106

OTHER PUBLICATIONS

Allari, S.; Barzaghi, G.; Bordegoni, M.; and Rizzi, C.; "Graphical Toolkit for the Development of User Interfaces in CIM Environment,"; Computer Applications in Production and Engineering, Proceedings of the Third International IFIP Conference (CAPE '89); Oct. 2-5, 1989; p. 633-40.

Kovacevic, Srdjan; "Beyond Automatic Generation—Exploratory Approach to UI Design,"; Computer-Aided Design of User Interfaces, Proceedings of the Third International Conference on Computer-Aided Design of User Interfaces; Oct. 21-23, 1999; p. 79-95.

Zloof, Moshe M.; "Selected Ingredients in End-User Programming,"; Visual Database Systems 4 (VDB4) IFIP TC2/WG2.6 Fourth Working Conference on Visual Database Systems; May 27-29, 1998; p. 3-17.

Gellersen, Hans-W.; "Support of User Interface Design Aspects in a Framework for Distributed Cooperative Applications,"; Proceedings of Research Issues in Interection Between Software Engineering and Human-Computer Interaction Conference; May 16-17, 1994; p. 196-210.

Bolcer, Gregory Alan; "User Interface Design Assistance for Large-Scale Software Development,"; Proceedings KBSE '94 Ninth Knowledge-Based Software Engineering Conference; Sep. 20-23, 1994; p. 142-9.

Baogang Zhou; "The Development of the Unix-Based User Interface Generator,"; Designing and Using Human-Computer Interfaces and Knowledge Based Systems Proceedings of the Third International Conference on Human Computer Interaction; Sep. 18-22, 1989; vol. II; p. 574-81.

* cited by examiner

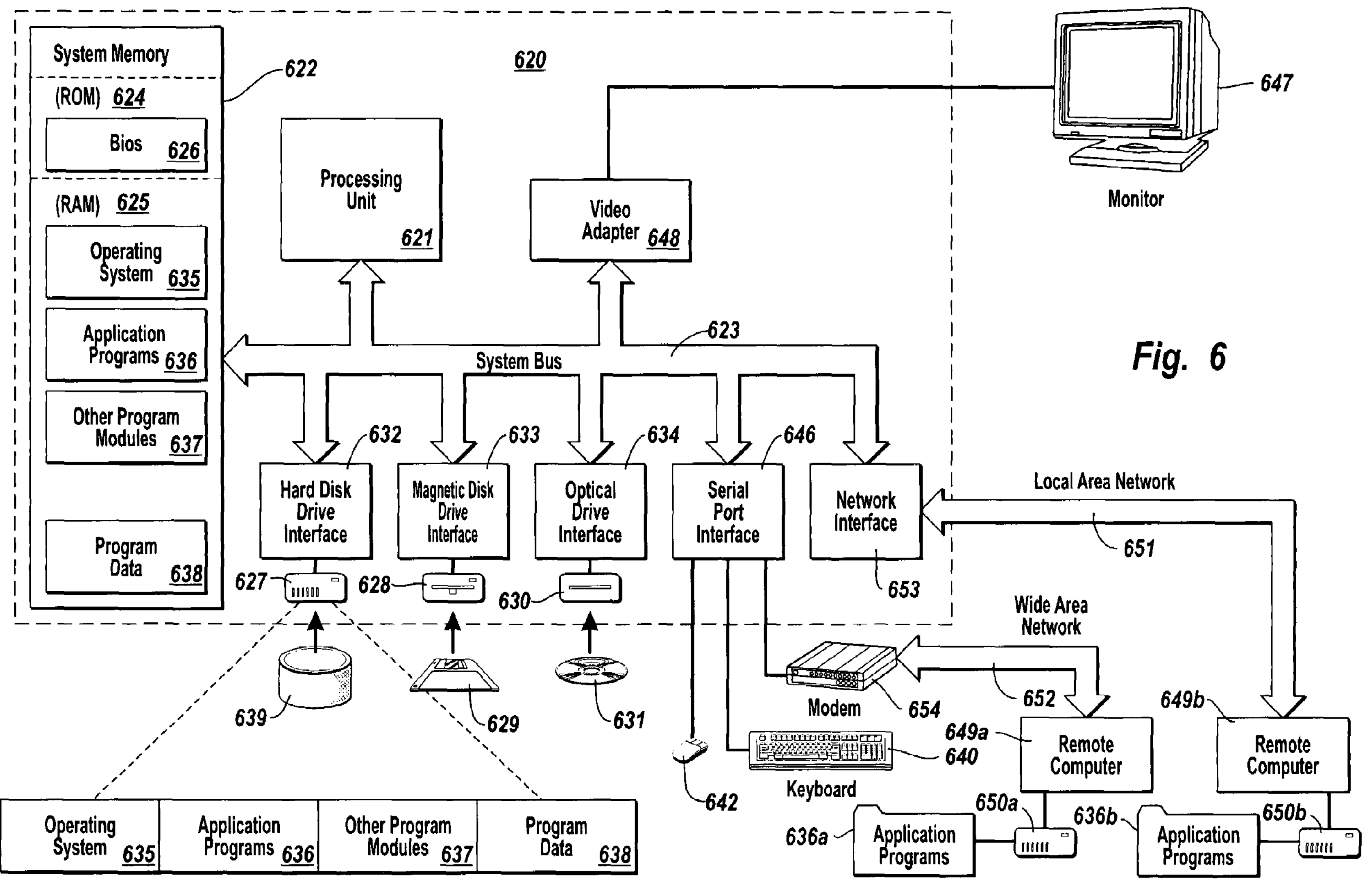
System Memory
(ROM) 624
Bios 626
(RAM) 625
Operating System 635
Application Programs 636
Other Program Modules 637
Program Data 638
622
620
Processing Unit 621
Video Adapter 648
647
Monitor
Fig. 6
623
System Bus
632
633
634
646
Hard Disk Drive Interface
Magnetic Disk Drive Interface
Optical Drive Interface
Serial Port Interface
Network Interface
Local Area Network
651
653
627
628
630
Wide Area Network
639
629
631
Modem
654
652
649b
649a
640
Remote Computer
Remote Computer
642
Keyboard
650a
636b
650b
636a
Application Programs
Application Programs
Operating System 635
Application Programs 636
Other Program Modules 637
Program Data 638

BEHAVIOR ARCHITECTURE FOR COMPONENT DESIGNERS

CROSS-REFERENCE TO RELATED APPLICATIONS

N/A

BACKGROUND OF THE INVENTION

1. The Field of the Invention

The present invention relates to control or object behavior within a visual user interface development tool. More particularly, the present invention relates to methods, systems, and computer program products for centrally managing user interface state information for the visual user interface development tool such that behavior for one or more user interface components or the visual user interface development tool itself may be defined dynamically at development time.

2. Background and Related Art

A visual user interface development tool allows a user to define the visual appearance of a user interface object and then generate a source code representation of the user interface object that can be compiled and included within a program for run-time execution. At design time, there is often a need to change how a user interface component or object interacts or behaves with the user/developer. One way development tools account for changes is to associate a designer with each component. The designer is responsible for controlling how the component behaves in response to mouse and keyboard messages, which properties can be set, and how the component is rendered at design or development time.

Often, due to parent-child relationships, some designers need to change or completely control the behavior of their children. With a complex development time scenario, these parent-child relationships eventually lead to a battle over the control of messages and component rendering. Further problems arise when trying to inject additional or new behavior-altering designers into the development tool. However, within a conventional development tool, there is no clear way to ensure that new behavior changes will: act appropriately, work along side other user interface modifiers, render correctly, or be removed cleanly without interrupting the development tool, visually or otherwise.

A significant part of the problem is architectural in nature. For traditional visual user interface development tools, a desired behavior is identified and executed through a large number of global flags which are distributed throughout the development tool. Available design time behaviors (such as, for example, dragging an object, resizing an object, selecting an object, etc.) are hardcoded within a single closed implementation. For example, conventional behavior implementations may include numerous if-then-else type tests of various global flag combinations to identify the code to be executed for a behavior of interest. Because the code and flags are distributed throughout the development tool, it is easy to overlook some of the implications of adding or modifying component behavior. As a result, the code related to design time behavior tends to be brittle, making it difficult for developers of the visual user interface development tool to introduce new behavior at any time, and making it all but impossible for third-party component developers to introduce new behaviors at design time.

Therefore, methods, systems, and computer program products for centrally managing behaviors that are defined at development time for a component within a visual user interface development tool or for the visual user interface development tool itself, are desired.

BRIEF SUMMARY OF THE INVENTION

The present invention relates to methods, systems, and computer program products that centralize component behavior for a visual user interface development tool. These methods, systems, and computer program products permit a component to define, at development time, one or more custom behaviors that are specific to the component itself or applicable the visual user interface development tool. In accordance with example implementations of the present invention, component behavior is centralized in a behavior service that allows behaviors to be defined at development time. The behavior service catches a message, such as a mouse message or keyboard message, that is generated in response to user input within the visual user interface development tool and routes the message to determine any behaviors that are available for use in processing the messages. For example, the behavior service determines if an extensible behavior store, that contains currently available behaviors, includes one or more behaviors for processing the message. If a behavior is included within the centralized and extensible behavior store, then the behavior is used to process the message.

A behavior may be associated with the visual user interface development tool in general, or an individual user interface component in particular. Because behaviors may be defined at development time and since the behaviors are centralized in the behavior service, adding previously unavailable behaviors to the behavior service is relatively straight forward for third party component developers. Accordingly, the behavior service may receive a behavior from a component within the visual user interface development tool and add the behavior to the extensible behavior store at development time.

Where a behavior corresponds to either a particular action being performed or a particular action to be performed, the behavior service may remove the behavior from the extensible behavior store when the particular action is completed. In this way, the centralized extensible behavior store enforces the existence of a single state for the particular action. In other words, the behavior service assures that only one behavior is active at any one time.

If no behavior is available for processing a message, the behavior service determines if a successfully hit tested glyph with a corresponding glyph behavior exists for the message. If so, the corresponding glyph behavior is used to process the message. Alternatively, if no successfully hit test glyph with corresponding glyph behavior is available, the message is not processed by the behavior service and the message is allowed to return to its normal route, e.g., to the design surface.

Similar to behaviors, the behavior service may receive one or more glyphs with a corresponding glyph behavior from a component within the visual user interface development tool at development time. Typically, these glyphs may be capable of hit testing and painting themselves. In some implementations, the glyphs may be organized into one or more adorner layers that may be independently disabled and enabled.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIG. 6 illustrates an example system that provides a suitable operating environment for the present invention.

DETAILED DESCRIPTION OF THE PREFERRED EMBODIMENTS

The present invention extends to methods, systems, and computer program products for centrally managing user interface state information for the visual user interface development tool such that behavior for one or more user interface components or the visual user interface development tool itself may be defined dynamically at development time. The embodiments of the present invention may comprise one or more special purpose and/or one or more general purpose computers including various computer hardware, as discussed in greater detail below.

Figure 1:
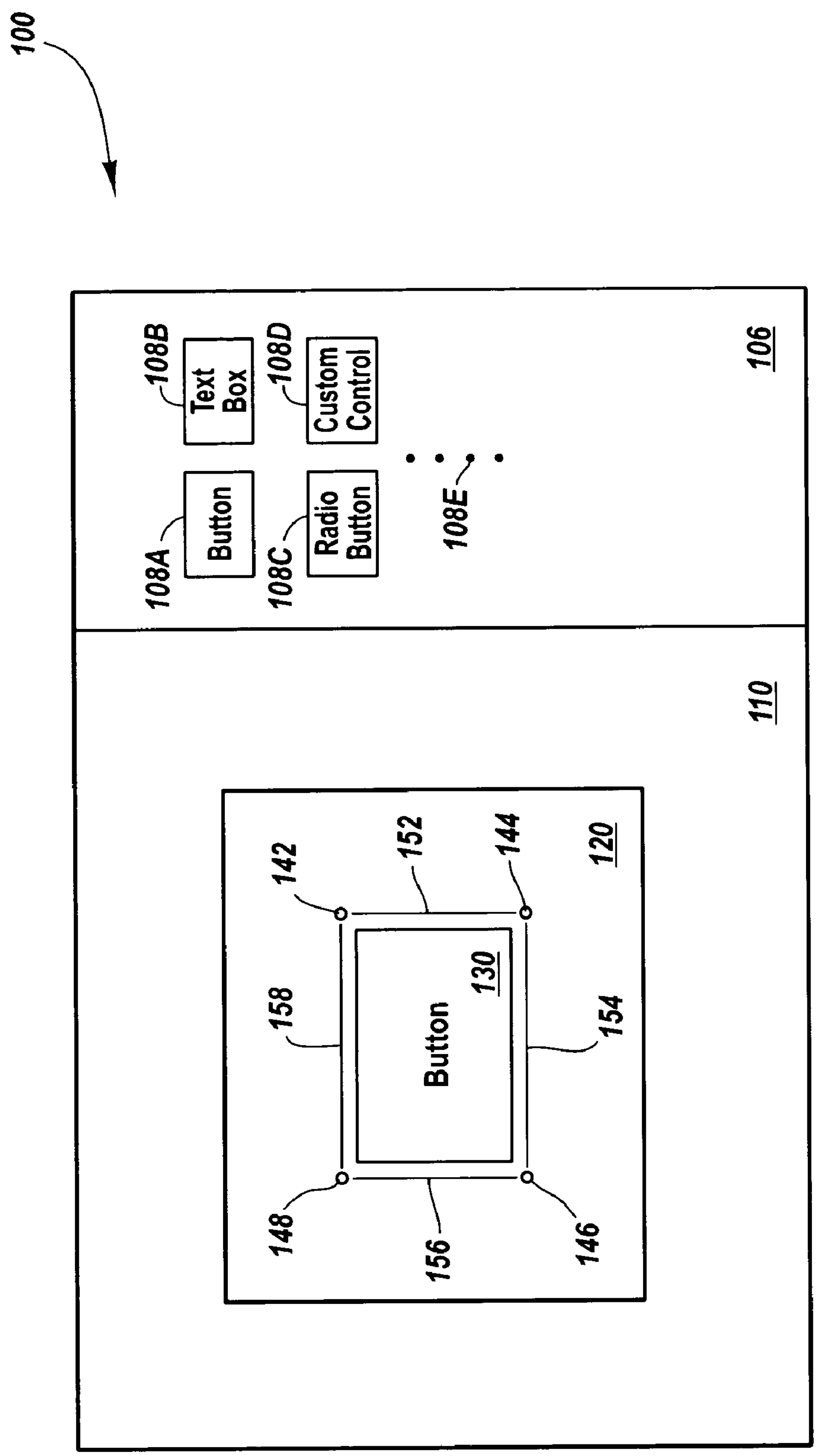
FIG. 1 shows an example visual user interface development tool.

FIG. 1 shows an example visual user interface development tool 100, with a component selection area 106 and a design surface 110 for developing user interface objects or components. Component area 106 shows various components that may be selected and integrated into a user interface object, such as button 108A, text box 108B, radio button 108C, custom control 108D, and other components 108E. Design surface 110 includes a button 130 and its associated designer 120. Among other things the designer 120 is responsible for controlling how the component behaves in response to mouse and keyboard messages, which properties can be set, and how the component is rendered at development time.

Various glyphs are shown in connection with button 130. Glyphs are user interface related images that are used for interacting with and displaying button 130. For example, glyphs 142, 144, 146, and 148 are used in resizing button 130. Glyphs 152, 154, 156, and 158 are used when selecting button 130. Within visual user interface development tool 100, glyphs often have a behavior associated with them. When a developer hovers the mouse over one of the resize glyphs, the cursor may change to a double sided arrow to indicate that the cursor is positioned properly for resizing button 130. Similarly, when a developer hovers the mouse over one of the selection glyphs, the cursor may change to a selection cursor, such as a four sided arrow, since movement frequently is associated with selection.

Note that resizing the button and moving the button are behaviors reserved for development or design time, and typically are prohibited when the button is integrated into a running user interface. Consider for example, development of an about box. Visual user interface development tool 100 allows for the creation of an OK button to dismiss the about box. During development time, resize and move behaviors are appropriate for the OK button. At runtime, however, once the about box is integrated into an application, resizing or moving the OK button is not permitted.

Of course, resize and move are common behaviors used here only for purposes of illustration. Because these behaviors are so common, generally a default implementation can be used for many different components. Nevertheless, even these basic behaviors may need to be modified in some circumstances. Consider, for example, a circular dial control. The default resize behavior may allow the dial to become distorted if the dial is expanded or contracted along only the horizontal or vertical axis. Accordingly, resize for the dial may be limited to expanding or contracting the radius of the dial. As a visual indication of this custom resize behavior, a custom glyph could be included with the dial control. As will be described in greater detail below, the custom behavior and glyph may be maintained by a central behavior service, such as the one shown in FIG. 2.

Figure 2:
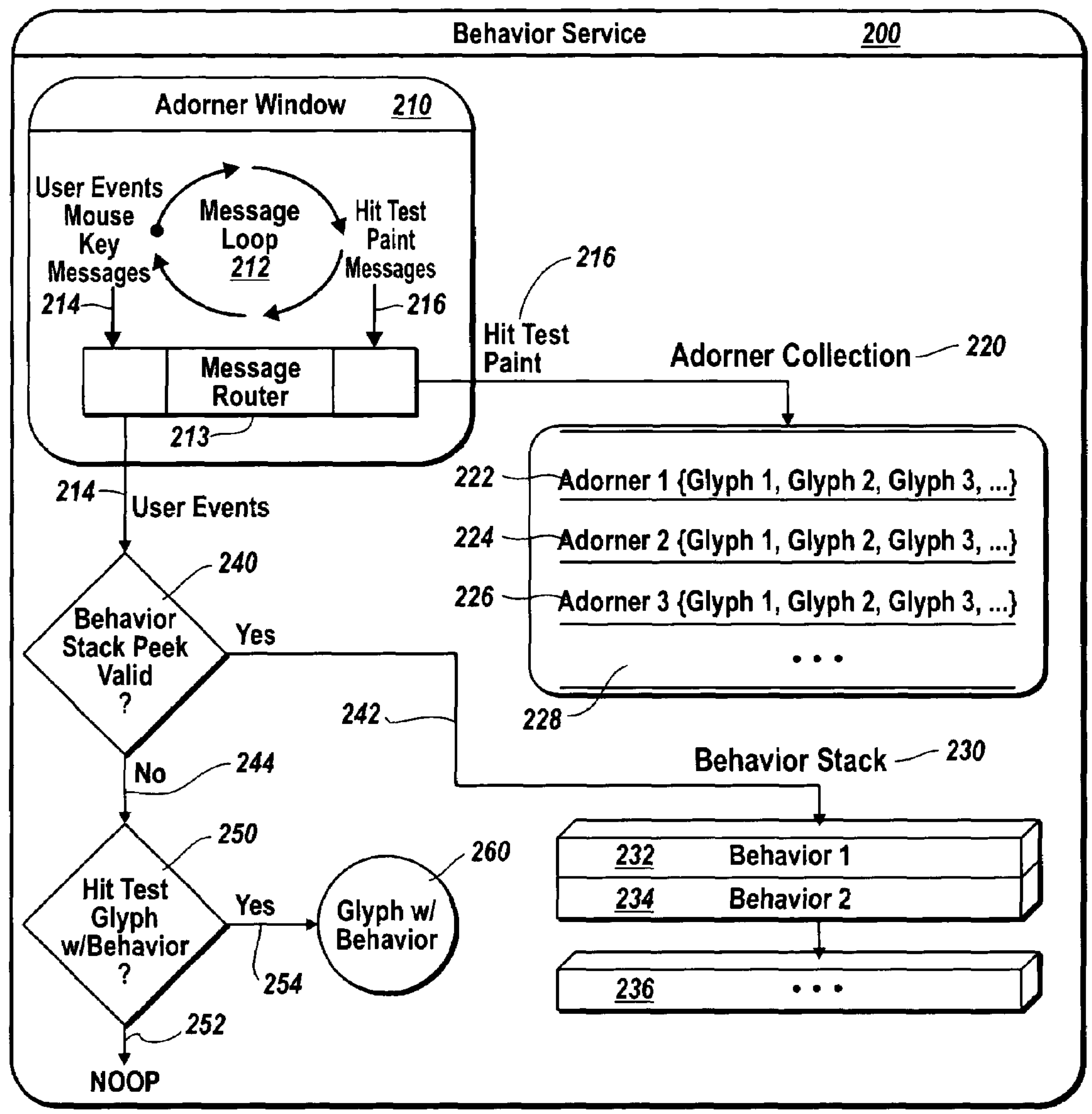
FIG. 2 illustrates an example behavior service in accordance with the present invention.

FIG. 2 illustrates an example behavior service 200 in accordance with the present invention. Behavior service 200 starts when a visual user interface development tool loads. It is accessible to any component that is capable of accessing a service provider. Because components may be used in a wide variety of environments, it is common for components to query for various known services to determine if they are available. If a particular service is not available, the component may implement some default functionality to account for the missing service. Accordingly, behavior service 200 may be one of several services that a component accesses at development time.

Upon creation, behavior service 200 creates a transparent adorner window 210. The adorner window 210 overlays everything in the design space (screen real estate) and provides a single platform for all additional user interface operations. For example, returning briefly to FIG. 1, adorner window 210 may cover the entire design surface 110 of a visual user interface development tool. Adorner window 210 is used to intercept all messages.

Along with managing the adorner window 210, behavior service 200 also controls an adorner collection 220 and a behavior stack 230. An adorner, such as adorner 1 222, adorner 2 224, adorner 3 226, and other adorners 228, represents a collection of user interface related glyphs. As described above, each glyph is responsible for hit testing and painting itself. A glyph also may have a reference to a behavior which can be invoked when a successful hit test has been determined.

For instance, returning to the dial example mentioned above, the dial may have a glyph for resizing. When the glyph is selected, the glyph indicates a successful hit test and calls its custom resize routine for changing the diameter of the dial. Other examples for using adorner collection 220 will be described below in connection with FIGS. 3 and 4.

Behavior stack 230 contains a list of behaviors, such as behavior 1 232 and behavior 2 234, and other behaviors 236. Any object, including a design or development time glyph, can push a new behavior on to behavior stack 230 resulting in a complete change of user interface activities. For instance, again returning to the dial example mentioned above, if the dial control is selected it may push a behavior on the behavior stack to process keyboard input, such as input from shift or control up and down arrow keys to resize the control. When the selection action is completed, the behavior is popped off the stack. Accordingly, the behavior stack 230 and behavior service 200 enforce the existence of a single state for the resize action of the dial control. In other words, the behavior service 200 assures that only one behavior is active at any given time.

All painting and hit test messages 216 received by the message loop 212 of adorner window 210 are forwarded to the behavior service's collection of adorners 220. In turn, each adorner 222, 224, 226, and 228 forwards the message to its glyphs so that they can paint and respond to hit tests. If an adorner becomes disabled, as described in more detail below with respect to FIG. 4, the adorner does not forward any user interface messages to the glyphs.

Messages received by the adorner window 210 ultimately are sent to behavior stack 230. If the behavior stack 230 is not empty (yes branch 242 of decision block 240), the top-most behavior, behavior 1 232, is invoked and has the first chance to process the message. If the behavior stack is empty (no branch 244 of decision block 240), the message is sent to the successfully hit tested glyph 260 (yes branch 254 of decision block 250). If there is no hit tested glyph (no branch 252 of decision block 250), the message is not processed by the behavior service 200 and is allowed to return to its normal route.

Figure 3:
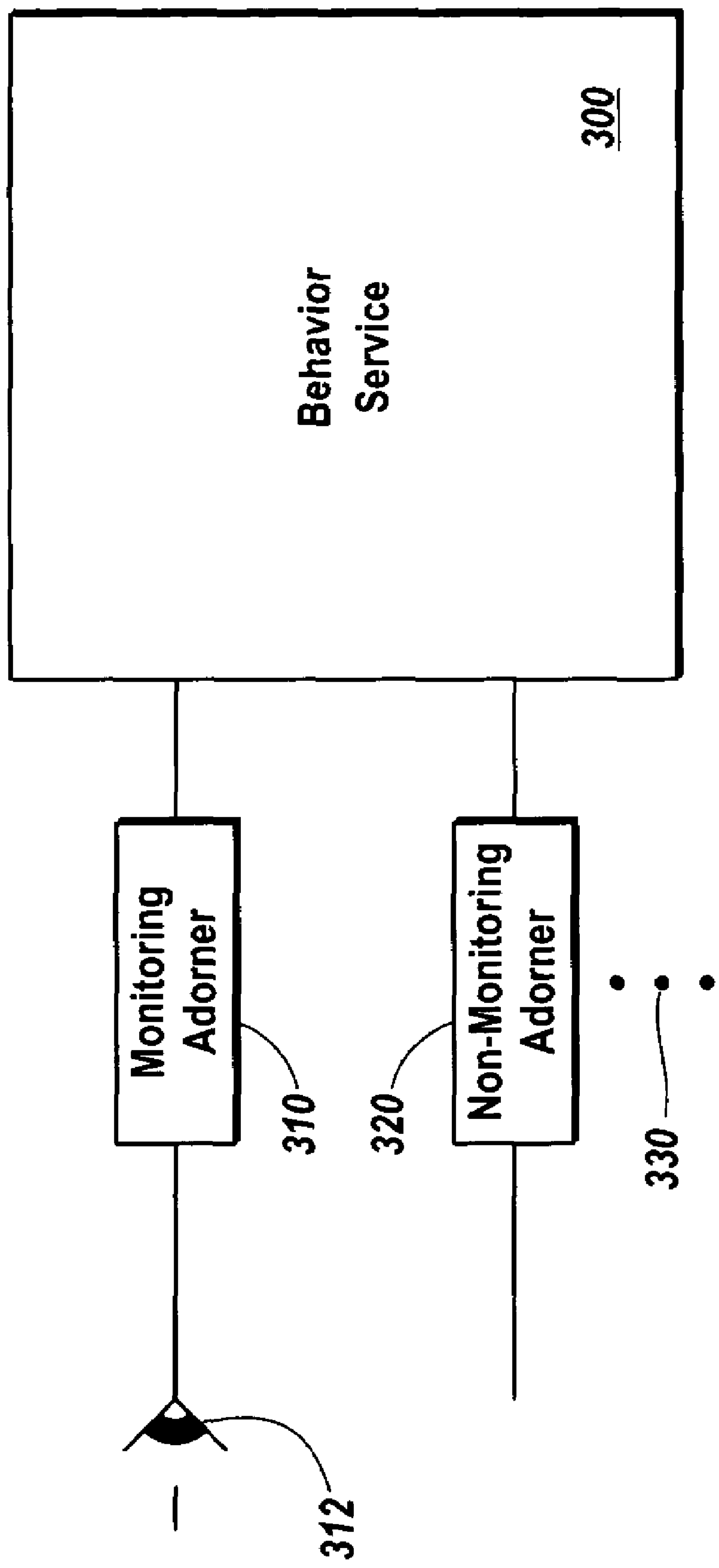
FIG. 3 shows example monitoring and non-monitoring component adorners in accordance with the present invention.

FIG. 3 shows a monitoring adorner 310, non-monitoring adorner 320, and other adorners 330 in accordance with the present invention. As discussed above, an adorner represents a collection glyphs, each of which is capable of hit testing and painting itself. All painting and hit test messages are forwarded to each adorner, which forwards the message to its glyphs so that they can paint and respond to hit tests. Non-monitoring adorner 320 follows this general pattern, simply forwarding received messages to its collection of glyphs.

Some adorners, however may be somewhat more sophisticated, such as monitoring adorner 310. Monitoring adorner 310 can dynamically choose when and where to offer glyphs. For example, monitoring adorner 310 may respond to selection by dynamically offering up glyphs that are available only when the corresponding component is selected. While frequently these glyphs will display on or near the selected component, they may display anywhere on the design surface. Furthermore, monitoring adorner 310 or some other monitoring adorner may respond similarly to other events, such as hovering, etc.

Figure 4:
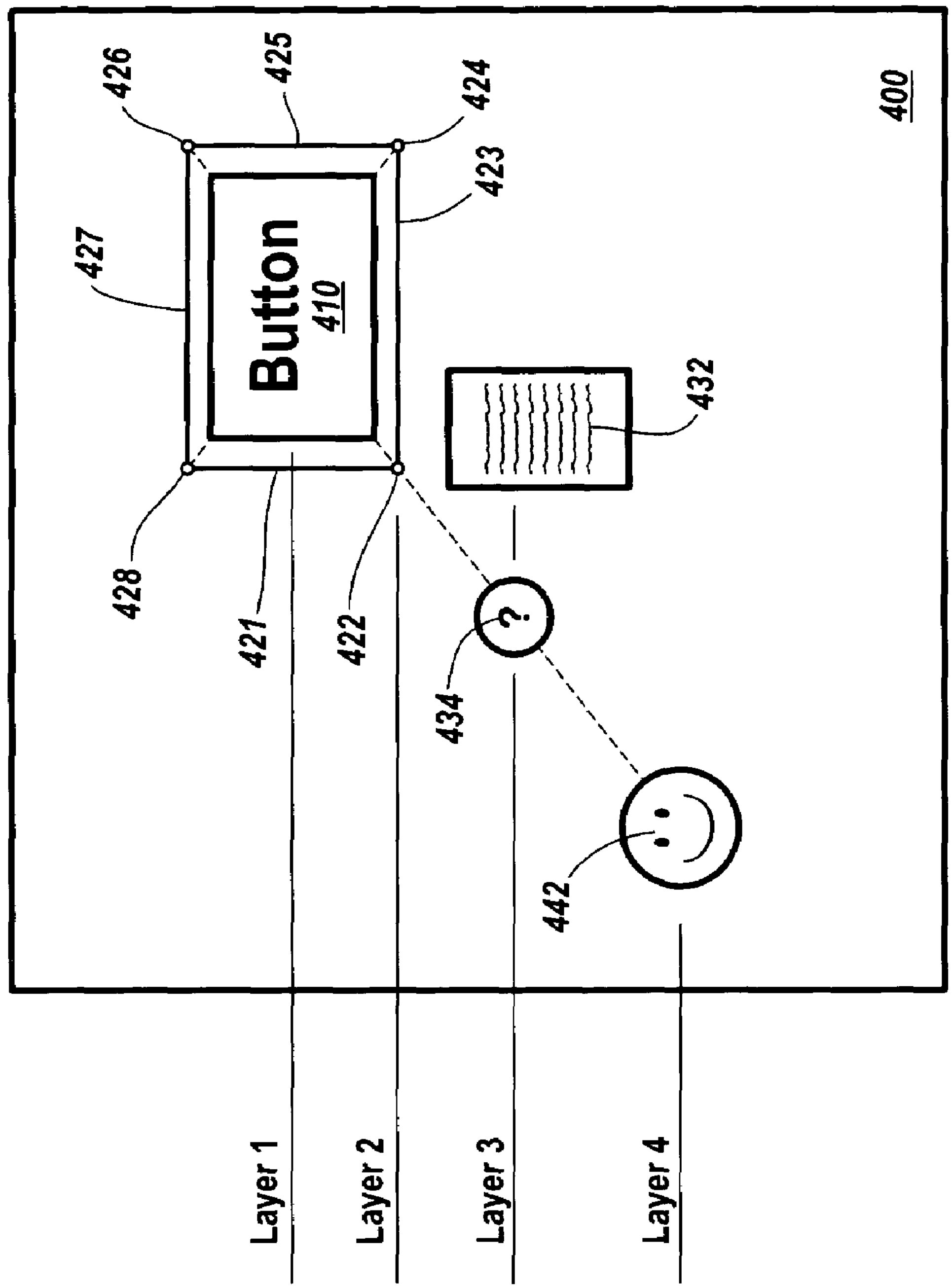
FIG. 4 illustrates various example glyphs organized into adorner layers in accordance with the present invention.

FIG. 4 illustrates various example glyphs organized into various adorner layers for button 410 within a visual design surface 400. Layer 1 includes only the button itself, and does not show any glyphs. Layer 2 includes resizing glyphs 422, 424, 426, and 428, and selection glyphs 421, 423, 425, and 427. Layer 3 includes a smart tag 434 with corresponding text 432. Layer 4 includes a smiley face 442. Note that based on this layering, smart tag 434 covers resize glyph 422, and smiley face 442 covers smart tag 434. Accordingly, from a developers perspective, only the smiley face 442 shows.

Organizing glyphs in adorner layers is a matter of convenience. Among other things, it allows all of the glyphs in a layer to be treated the same for certain actions or operations. For example, by grouping the resize glyphs into a single adorner layer, resizing could be disabled by simply disabling the corresponding adorner layer. Adorner layers also provide for customizing existing functionality. For example, button 410 may include resizing glyphs 422, 424, 426, and 428, and selection glyphs 421, 423, 425, and 427, as well as the corresponding functionality, by default. Rather than developing a new button that includes a smart tag in place of a resize glyph, the smart tag simply may be placed over the resize glyph within the visual user interface development tool. As a result, adorner layers offer the ability to customize the appearance of an object, without significant changes to the object itself. Because conventional visual user interface development tools tend to distribute paint operations throughout the code, trying to place one glyph over another often lead to unpredictable results, and in some cases was not possible.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 5:
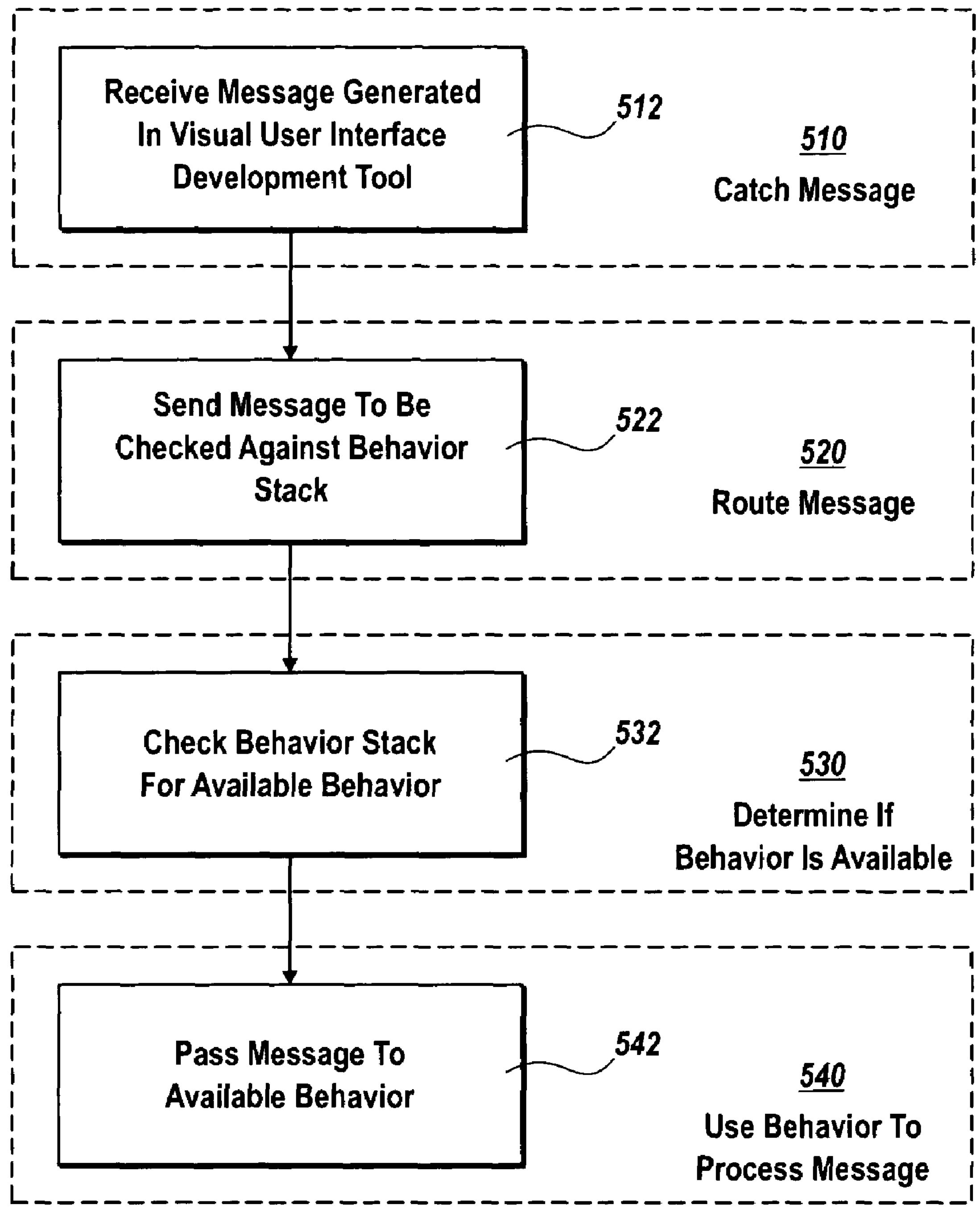
FIG. 5 shows example acts and steps for methods of centrally managing user interface state information in accordance with the present invention.

FIG. 5 shows example acts and steps for methods of centrally managing user interface state information in accordance with the present invention. A step for catching (510) a message generated in response to user input within a visual user interface development tool may include an act of receiving (512) the message. A step for routing (520) the message to determine any behaviors that are available for use in processing the message may include an act of sending (522) the message to be checked against a centralized behavior stack for one or more behaviors to use in processing the message.

A step for determining (530) if a centralized and extensible behavior store that contains currently available behaviors includes one or more behaviors for processing the message may include an act of checking (532) a centralized behavior stack containing the currently available behaviors for processing messages to determine if a behavior is available. A step for using (540) a behavior to process a message may include an act of passing (542) the message to an available behavior for processing. A step for adding (not shown) a behavior to an extensible behavior store may include an act of pushing (not shown) the behavior on a centralized behavior stack. A step for determining (not shown) if a successfully hit test glyph with a corresponding glyph behavior exists for a message may include an act of checking (not shown) for a successfully hit test glyph. A step for using (not shown) the corresponding glyph behavior to process the message may include an act (not shown) of passing the message to the glyph behavior.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an exemplary system for implementing the invention includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649*a* and 649*b*. Remote computers 649*a* and 649*b* may each be another personal computer, a server, a router, a network PC, a peer device or other common network node, and typically include many or all of the elements described above relative to the computer 620, although only memory storage devices 650*a* and 650*b* and their associated application programs 636*a* and 636*b* have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computer system that supports a visual user interface development tool, a method of centrally managing user interface state information for the visual user interface development tool such that behavior for one or more user interface components or the visual user interface development tool itself may be defined dynamically at development time, the method comprising acts of:

creating a transparent adorner window overlaying a design space of the visual user interface development tool, the transparent adorner window being adapted to intercept messages of the visual user interface development tool;

intercepting a message generated within the visual user interface development tool during the development of one or more user interface components;

sending the message to a centralized extensible behavior stack to check for one or more behaviors to use in processing the message, wherein a behavior describes the manner in which the user interface components or the visual user interface development tool processes the message resulting in a user interface activity dependent upon the behavior such that the functionality of the user interface components or the visual user interface development tool is defined by the behavior;

checking the centralized extensible behavior stack containing currently available behaviors for processing messages to determine if a behavior is available to process the message; and if a behavior is available on the centralized extensible behavior stack, then passing the message to the available behavior for processing thereby resulting in a dynamically defined functionality and appearance of the interface; and wherein no behavior is available on the centralized extensible behavior stack for processing the message, the method further comprising an acts of: checking for a successfully hit tested glyph with a corresponding glyph behavior for the message; and if available, passing the message to the glyph behavior of the successfully hit tested glyph.

2. A method as recited in claim 1, wherein the behavior is available on the centralized extensible behavior stack, and wherein the behavior is associated with the visual user interface development tool, as opposed to an individual user interface component within the visual user interface development tool.

3. A method as recited in claim 1, wherein the behavior is available on the centralized extensible behavior stack, and wherein the behavior is associated with an individual user interface component within the visual user interface development tool, as opposed to the visual user interface development tool itself.

4. A method as recited in claim 3, wherein the individual user interface component comprises a third party component developed separately from the visual user interface development tool.

5. A method as recited in claim 3, wherein the behavior comprises asking the individual user interface component for any glyphs that are part of the individual user interface component.

6. A method as recited in claim 1, further comprising acts of:

receiving the behavior from a component within the visual user interface development tool during development time; and pushing the behavior on the centralized extensible behavior stack.

7. A method as recited in claim 1, further comprising an act of receiving one or more glyphs with corresponding glyph behavior from a component within the visual user interface development tool during development time, wherein each of the one or more glyphs is capable of hit testing and painting itself.

8. A method as recited in claim 1, wherein the dynamically defined behavior is directly related to at least one functionality of the interface component selected from the group comprising: dragging an object, resizing an object, and selecting an object.

9. For a computer system that supports a visual user interface development tool, a computer program product comprising one or more computer readable storage media storing computer executable instructions that implement a method of centrally managing user interface state information for the visual user interface development tool such that behavior for one or more user interface components or the visual user interface development tool itself may be defined dynamically at development time, the method comprising acts of:

creating a transparent adorner window overlaying a design space of the visual user interface development tool, the transparent adorner window being adapted to intercept messages of the visual user interface development tool;

intercepting a message generated within the visual user interface development tool during the development of one or more user interface components;

sending the message to a centralized extensible behavior stack to check for one or more behaviors to use in processing the message, wherein a behavior describes the manner in which the user interface components or the visual user interface development tool processes the message resulting in a user interface activity dependent upon the behavior such that the functionality of the user interface components or the visual user interface development tool is defined by the behavior;

checking the centralized extensible behavior stack containing currently available behaviors for processing messages to determine if a behavior is available to process the message; and if a behavior is available on the centralized extensible behavior stack, then passing the message to the available behavior for processing thereby resulting in a dynamically defined functionality and appearance if the; and wherein no behavior is available on the centralized extensible behavior stack for processing the message, the method further comprising an acts of: checking for a successfully hit tested glyph with a corresponding glyph behavior for the message; and if available, passing the message to the glyph behavior of the successfully hit tested glyph.

10. A computer program product as recited in claim 9, wherein the behavior is available on the centralized extensible behavior stack, and wherein the behavior is associated with an individual user interface component within the visual user interface development tool, as opposed to the visual user interface development tool itself.

11. A computer program product as recited in claim 9, the method further comprising acts of:

receiving the behavior from a component within the visual user interface development tool during development time; and pushing the behavior on the centralized extensible behavior stack.

12. A computer program product as recited in claim 11, wherein the behavior corresponds to a particular action either being performed or to be performed on a user interface component within the visual user interface development tool, the method further comprising an act of popping the behavior off the centralized behavior stack when the particular action is completed.

13. A computer program product as recited in claim 12, wherein the centralized extensible behavior stack enforces the existence of a single state for the particular action.

14. A computer program product as recited in claim 9, the method further comprising an act of receiving one or more glyphs with corresponding glyph behavior from a component within the visual user interface development tool during development time, wherein each of the one or more glyphs is capable of hit testing and painting itself.

15. A computer program product as recited in claim 1, wherein the one or more glyphs are organized into one or more adorner layers.

16. A computer program product as recited in claim 15, the method further comprising an act of disabling at least one of the one or more adorner layers.

17. In a computer system that supports a visual user interface development tool, a method of centrally managing one or more behaviors that are dynamically defined at development time for a component within the visual user interface development tool or for the visual user interface development tool itself, the method comprising steps for:

catching a message generated in response to user input within the visual user interface development tool during the development of one or more user interface components;

routing the message to a centralized and extensible behavior store that contains currently available behaviors to determine any behaviors that are available for use in processing the message, wherein a behavior describes the manner in which the user interface components or the visual user interface development tool processes the message resulting in a user interface activity dependent upon the behavior such that the functionality of the user interface components or the visual user interface development tool is defined by the behavior;

determining if the centralized and extensible behavior store includes one or more behaviors for processing the message; and if a behavior is included within the centralized and extensible behavior store, then using the behavior to process the message thereby resulting in a dynamically defined functionality and appearance of an interface; and wherein no behavior is available on the centralized extensible behavior stack for processing the message, the method further comprising an acts of: checking for a successfully hit tested glyph with a corresponding glyph behavior for the message; and if available, passing the message to the glyph behavior of the successfully hit tested glyph, wherein no successfully hit test glyph with corresponding glyph behavior is available for the message.

18. A method as recited in claim 17, wherein the behavior is available on the centralized behavior stack, and wherein the behavior is associated with an individual user interface component within the visual user interface development tool, as opposed to the visual user interface development tool itself.

19. A method as recited in claim 17, further comprising:

an act of receiving the behavior from a component within the visual user interface development tool during development time; and a step for adding the behavior to the extensible behavior store.

20. A method as recited in claim 17, further comprising an act of receiving one or more glyphs with corresponding glyph behavior from a component within the visual user interface development tool during development time, wherein each of the one or more glyphs is capable of hit testing and painting itself.

21. A method as recited in claim 17, wherein the message comprises one of a user event, a mouse message, and a keyboard message.

22. A method as recited in claim 17, wherein the centralized and extensible behavior store contains all currently available behaviors.

23. For a computer system that supports a visual user interface development tool, a computer program product comprising one or more computer readable storage media carrying computer executable instructions that implement a method of centrally managing one or more behaviors that are dynamically defined at development time for component within the visual user interface development tool or for the visual user interface development tool itself, the method comprising steps for:

catching a message generated in response to user input within the visual user interface development tool during the development of one or more user interface components;

routing the message to a centralized and extensible behavior store that contains currently available behaviors to determine any behaviors that are available for use in processing the message, wherein a behavior describes the manner in which the user interface components or the visual user interface development tool processes the message resulting in a user interface activity dependent upon the behavior such that the functionality of the user interface components or the visual user interface development tool is defined by the behavior;

determining if the centralized and extensible behavior store includes one or more behaviors for processing the message; and if a behavior is included within the centralized and extensible behavior store, then using the behavior to process the message thereby resulting in a dynamically defined functionality and appearance of an interface; and wherein no behavior is available on the centralized extensible behavior stack for processing the message, the method further comprising an acts of: checking for a successfully hit tested glyph with a corresponding glyph behavior for the message; and if available, passing the message to the glyph behavior of the successfully hit tested glyph.

24. A computer program product as recited in claim 23, wherein the behavior is available on the centralized behavior stack, and wherein the behavior is associated with an individual user interface component within the visual user interface development tool, as opposed to the visual user interface development tool itself.

25. A computer program product as recited in claim 23, the method further comprising:

an act of receiving the behavior from a component within the visual user interface development tool during development time; and a step for adding the behavior to the extensible behavior store.

26. A computer program product as recited in claim 23, wherein the behavior defines a new custom behavior previously unavailable within the visual user interface designer.

27. A computer program product as recited in claim 23, the method further comprising an act of receiving one or more glyphs with corresponding glyph behavior from a component within the visual user interface development tool during development time, wherein each of the one or more glyphs is capable of hit testing and painting itself.

28. A computer program product as recited in claim 27, wherein the one or more glyphs are organized into one or more adorner layers.

29. A computer program product as recited in claim 28, the method further comprising an act of disabling at least one of the one or more adorner layers.

30. A computer program product as recited in claim 27, wherein the one or more glyphs comprise at least one custom glyph for the component.

31. A computer program product as recited in claim 27, wherein the message corresponds to at least one of a hit test message and a paint message.

32. A computer program product comprising one or more computer readable storage media carrying computer executable instructions that centralizes component behavior for a visual user interface development tool and permits a component to define at development time one or more custom behaviors that are specific to the component itself or applicable the visual user interface development tool, the computer executable instructions comprising:

an extensible behavior stack that contains one or more development time specified behaviors for the visual user interface development tool or a component within the visual user interface development tool, wherein a behavior describes the manner in which the user interface components or the visual user interface development tool processes the message resulting in a user interface activity dependent upon the behavior such that the functionality of the user interface components or the visual user interface development tool is defined by the behavior;

a extensible collection of one or more adorners, each containing one or more development time specified glyphs capable of hit testing and painting themselves, wherein at least one of the one or more glyphs includes a reference to a glyph behavior to invoke when a successful hit test has been determined; and a message router that routes one or more received messages generated in response to user input within a visual user the visual interface development tool to either the extensible behavior stack or the extensible collection of one or more adorners; and wherein no behavior is available on the centralized extensible behavior stack for processing the message, the computer executable instructions further comprising an acts of: checking for a successfully hit tested glyph with a corresponding glyph behavior for the message; and if available, passing the message to the glyph behavior of the successfully hit tested glyph.

33. A computer program product as recited in claim 32, the computer executable instructions further comprising an adorner window that intercepts one or more messages directed to the visual user interface development tool.

34. A computer program product as recited in claim 32, wherein the message router routes a received user event message, a received mouse message, or a received keyboard message to the extensible behavior stack.

35. A computer program product as recited in claim 32, wherein the message router routes a received a received hit test message or a received paint message to the extensible collection of one or more adorners.

36. A computer program product as recited in claim 32, wherein the one or more adorners organize the one or more development time specified glyphs into layers which can be independently disabled and enabled.

37. A computer program product as recited in claim 32, wherein the component within the visual user interface development tool comprises a third party component developed separately from the visual user interface development tool.

* * * * *